(12) United States Patent
Hsu et al.

(10) Patent No.: US 8,793,541 B2
(45) Date of Patent: Jul. 29, 2014

(54) LINK EQUALIZATION TESTER (71) Applicant: Teledyne LeCroy, Inc., Thousand Oaks, CA (US)

(72) Inventors: Linden Hsu, Cupertino, CA (US); Thomas R. Kennedy, III, Alviso, CA (US); Samuel Sukhi Bae, San Jose, CA (US); Christopher F. Forker, Redwood City, CA (US); Shlomi Krepner, Sunnyvale, CA (US); Yigal Shaul, Cupertino, CA (US)

(73) Assignee: Teledyne LeCroy, Inc., Thousands Oaks, CA (US)

( * ) Notice: Subject to any disclaimer, the term of this patent is extended or adjusted under 35 U.S.C. 154(b) by 0 days.

(21) Appl. No.: 13/719,350

(22) Filed: Dec. 19, 2012

(65) Prior Publication Data

US 2013/0145212 A1 Jun. 6, 2013

Related U.S. Application Data (63) Continuation-in-part of application No. 12/248,959, filed on Oct. 10, 2008, now Pat. No. 8,347,153.

(51) Int. Cl.
*G06F 11/263* (2006.01)
*H04L 1/24* (2006.01)
*G06F 11/30* (2006.01)
*H04L 12/26* (2006.01)

(52) U.S. Cl.
CPC .. *H04L 1/24* (2013.01); *H04L 43/50* (2013.01)
USPC .......................................... 714/704; 714/712

(58) Field of Classification Search
CPC ............. H04L 1/20; H04L 1/24; H04L 43/50; H04L 12/2697; H04J 3/14; G06F 11/221; G01R 31/31716; G01R 31/31701; G01R 31/31813; G01R 31/3167; G01R 31/2884; G01R 31/318307; G11C 29/56

See application file for complete search history.

(56) References Cited

U.S. PATENT DOCUMENTS

| 5,014,272 A | 5/1991 | Yoshida |
| 6,094,737 A | 7/2000 | Fukasawa |
| 6,173,017 B1 | 1/2001 | Marz |

(Continued)

OTHER PUBLICATIONS

Tektronix, PCI Express 3.0 Testing Approaches for PHY Layer, May 3, 2011, slides 1-42.*

(Continued)

*Primary Examiner* — Ajay Bhatia
*Assistant Examiner* — Dipakkumar Gandhi
(74) *Attorney, Agent, or Firm* — Gordon Kessler (57) ABSTRACT A method and an apparatus for performing link equalization testing via a physical layer test and measurement system. The system includes a protocol aware test apparatus for transmitting testing data, a device under test for receiving the transmitted testing data, and an oscilloscope for receiving an output waveform from the device under test. The protocol aware test apparatus selects a first of a plurality of preset values, sends an equalization signal from the protocol aware test apparatus to the device under test, and changes a speed of communication to a predetermined speed and sends a compliance pattern to the device under test after placing the device under test in a loopback mode. A waveform output from the device under test is captured by the oscilloscope, and is analyzed to determine compliance of the device under test with a predetermined link equalization speed in accordance with a predetermined protocol.

20 Claims, 11 Drawing Sheets (56) References Cited

U.S. PATENT DOCUMENTS

| | | | |
|---|---|---|---|
| 6,504,919 B1* | 1/2003 | Takagi et al. | 379/100.17 |
| 6,577,696 B1 | 6/2003 | Burgmeier et al. | |
| 6,724,839 B1* | 4/2004 | Chan et al. | 375/346 |
| 7,254,755 B2 | 8/2007 | de Obaldia et al. | |
| 7,310,503 B2 | 12/2007 | Ido | |
| 7,359,216 B2* | 4/2008 | Hall | 361/796 |
| 2004/0083077 A1* | 4/2004 | Baumer et al. | 702/185 |
| 2005/0283697 A1 | 12/2005 | Kang et al. | |
| 2005/0286436 A1 | 12/2005 | Flask | |
| 2007/0002990 A1 | 1/2007 | Lee et al. | |
| 2007/0100596 A1 | 5/2007 | Hollis | |
| 2008/0130508 A1 | 6/2008 | Vikstedt et al. | |

OTHER PUBLICATIONS

Tektronix, Tektronix PCI Express Logic Protocol Analyzer, TLA7SA00 Series Data Sheet, Dec. 28, 2011, pp. 1-8.*

* cited by examiner

LINK EQUALIZATION TESTER

CROSS REFERENCE TO RELATED APPLICATIONS

The present application is a Continuation-In-Part application of U.S. patent application Ser. No. 12/248,959, titled "Protocol Aware Error Ratio Tester", filed Oct. 10, 2008 to Krepner et al., currently pending, the entire contents thereof being incorporated herein by reference.

BACKGROUND

This application relates to test systems intended for test and measurement of the physical layer of high speed serial communication protocols and technologies, and to implementation of a link equalization technique through a link equalization tester to allow for data traffic to proceed at a highest possible data transfer speed.

Traditional testing of high speed communication channels requires multiple pieces of expensive test equipment. The test equipment is expected to perform testing of data on one or more particular communication channels. In some cases, currently available equipment is not able to perform a particular desired test because of a lack of understanding by the test instrument of a protocol defining a data format of the data to be tested. Various proprietary solutions using extensive test equipment at significant cost have been tried as well. In addition, proprietary software code must be specifically developed to coordinate the functioning of these products and allow the combination to perform a particular desired test. Thus, transceiver testing based on currently available test modes in the Serial Attached SCSI (SAS) and Serial Advanced Technology Attachment (SATA) standards, for example, are very complicated to create in the lab due to equipment limitations. Additional link equalization requirements place additional burden on any such test equipment.

SUMMARY

The inventors of the present invention have recognized that testing for protocol physical layer errors has become a difficult proposition. Existing tools may currently be used to test for protocol bit errors, however, they have one or more particular drawbacks. A Bit Error Ratio (BER) Test for example is typically performed using a serial or parallel Bit Error Ratio Tester (BERT). Because the test using a BERT is performed at a level that only recognizes errors in individual bits, the BERT has no knowledge of whether a particular Cyclic Redundancy Check (CRC) or higher level error checking scheme is in use. The BERT also does not have any knowledge regarding packet boundaries that may be defined in accordance with a particular protocol definition in use by devices in communication. When being tested by such a BERT, if two errors fall in a same protocol defined logical packet, for example, the BERT would count two errors. However, at the protocol level, because the specification defining the protocol is based on counting packet errors, there should only be one error recorded.

In addition, a traditional BERT cannot put SAS and SATA devices into a loopback state. Thus, users are forced to first use a protocol generator/exerciser to place these devices under test in this particular state, and then connect the BERT to the device under test to perform the test. Many times this sequence of events may cause the DUT to lose a connection link and disconnect or otherwise fail to properly test the device under test.

As described above, it would therefore be desirable to be able to perform physical layer testing of a device using only features in the device that are "required" by a protocol specification and not using special control programs and multiple test tools.

In accordance with the invention, to accomplish this testing, a Device Under Test (DUT) is preferably placed into one of the following test states:

BIST (Built In Self-Test) retimed or direct loopback mode. In this mode the DUT is instructed to send back the same bits after or before the bits are provided into internal sampling circuitries Application level loop. In this mode information is looped back to the sending device after the bits are passed through all protocol layers up to the application level Live traffic mode. In this mode an error count is calculated at the frame level. A receiver is instructed to acknowledge every packet of information it receives with a low level packet or symbol acknowledge. If no such acknowledge is provided, the transmitter is able to determine that there was one or more bit errors in the last frame it provided to the device under test.

When in any of these states, in order to perform desired testing, patterns that are stressed in amplitude, timing and jitter are transmitted to the device under test. The device under test processes the received patterns based upon the particular current test state. The returned bits/frames are examined for any errors and a count is kept of total number of bits/frames and bit/frame errors. In accordance with the invention, such testing is able to be performed in a standard operating environment. As noted above, it is not possible to perform this type of measurement with an ordinary BERT because of its inability to test the device in such a standard operating environment. For example, in SAS/SATA protocols the returned frames may have additional ALIGNS which prevent sync from being obtained. The aforementioned existing equipment is unable to deal with this, as well as other situations. Thus the user is required to overcome this limitation by connecting the clock domains of the Rx and TX in the unit under test. As a result, current testing does not effectively test the device under test in its real mode of operation.

In addition to performing the above test measurements, it is desirable to allow for testing of other important features, such as dynamic link equalization. Such processes allow for two devices to communicate at the fastest communication speed available, while allowing for communication with slower devices. Such a speed determination is preferably made on a real time basis when in use. Such dynamic link equalization includes the process of actively negotiating link equalizations to counteract possible physical impairment, or for any other desired reason. Such negotiating preferably includes processes for requesting equalization parameters and responding to equalization requests. Such response to equalization settings include both protocol logic changes and physical electronic changes Therefore, it is necessary to confirm and test that any device purporting to adhere to a protocol that requires such dynamic and link equalization can perform the required processes for negotiating such link equalization. In accordance with the present invention, such a protocol may be PCI Express 3.0, but may include any protocol requiring such link equalization.

In accordance with an embodiment of the invention, a test and measurement apparatus is provided that preferably comprises a combination of a traditional BERT and protocol exerciser, plus specialized hardware/logic/software that makes it all work together to be able to perform physical layer testing across many protocols and to meet the rigorous requirements of PCI Express Gen 3.0 link training status and state machine (LTSSM).

Traditionally, BERTs are protocol agnostic and are unable to negotiate with other devices to properly test this negotiation that will take place between devices when under use and adhering to, for example, the PCI Express Gen 3.0 standard. Additionally, protocol exercisers are generally specific to a single protocol (perhaps spanning one or more generations of a protocol). An inventive test apparatus (preferably a Teledyne LeCroy PeRT3 Phoenix) has a BERT's high signal quality, multiple noise sources, multiple patterns (pre-defined and user-definable), and bit error counting capability. The test apparatus preferably has a protocol exerciser's protocol awareness (ability to speak and interpret information based upon the protocol) and flexibility to change what and how a device is exercised, plus the ability to handle multiple protocols. The test apparatus is therefore able to control, in real-time, both protocol and electrical characteristics in a manner that has been previously unavailable. Combining both into one allows for testing that up until now could not be performed with commercial off-the-shelf equipment.

Thus, in accordance with the invention, a protocol aware Error Ratio Tester is provided that allows a user to be able to perform desired physical layer testing, as in part described above.

The invention preferably comprises two modules. A first module is a GPP (General Purpose Platform) that is responsible for protocol awareness. A second module is an AFE (Analog Front End) that is responsible for high quality signal generation and addition of various jitter components and signal waveform shaping. These functions allow the user to gain unprecedented control over the transmitted signal and to emulate real system conditions without the need for multiple hooks to external passive (PCBs for example) or active (signal and waveform generators for example) devices. Operating software in accordance with the invention allows for control of the new AFE module functionality, control of the bit error test (or frame error test), construction and generation of test patterns, knowledge of any appropriate FPGA code to perform required checking on the returned frames, and tracking of any accumulated statistics.

As noted above, in accordance with the PCI Express 3.0 protocol, link equalization is to be performed in a dynamic manner. This "dynamic" link equalization means that both a transmitting and a receiving device include settings, such as link speed and any other equalization parameters that are determined to be appropriate, that may be changed at run time based upon negotiation between these two devices. The desire for such dynamic link equalization assures that any device or product operating in accordance with a standard supporting such dynamic link equalization, such as the PCI Express 3.0 protocol, will be able to operate in a manner resulting in a most preferred signal shape at the receiver, and may also include operation at their highest advertised bit rates. Thus, in accordance with an embodiment of the invention, failure to negotiate a minimum acceptable optimization signal shape at a highest speed, for example, will result in operation at a lower bit rate (speed) in order to determine whether the minimum optimization signal shape may be achieved at this lower bit rate. Such optimization determination may be performed at any number of different bit rates until a minimum acceptable optimization signal shape is achieved. Thus, any pair of devices will preferably operate at the fastest available bit rate of the slower of the pair of devices that still allows for achievement of a minimum acceptable optimization signal shape. Because of the great number of different components that may take advantage of a protocol such as PCI Express 3.0, optimal equalization setting for each combination of components can vary. For example, different settings may be optimal for a server versus a workstation motherboard and the like. Thus, there are too many add-in cards and motherboards to test all possible available combinations in advance. In addition, with the development of additional components, the number of tests needed to be performed moving forward would grow exponentially.

Figure 5:
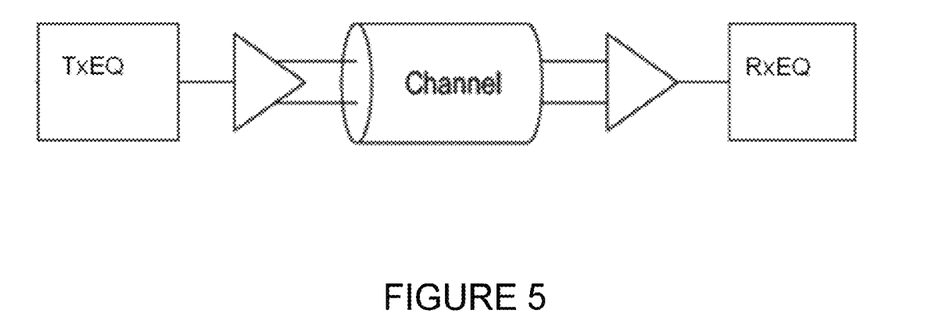
FIG. 5 is a depiction of data flow from a transmitting device to a receiving device via a channel.

Therefore, in accordance with PCI Express 3.0, for example, dynamic equalization is employed, letting each component figure out the best setting based upon the situation. Therefore, as is shown in FIG. 5, a transmitting device including equalization TxEQ transmits data along a Channel to a receiving device including equalization RxEQ. In such a process, the transmitting device Tx implements a FIR based equalization. In a preferred embodiment, 1 of 11 presets, for example, or 1 of 42 or more cursors may be employed during the equalization process of the transmitter TxEQ. Such equalization is preferably based upon 3-tap (precursor+main cursor+post cursor) to create de-emphasis and pre-shoot. Upon transmission of data through the Channel, the receiving device Rx implements a behavior equalization algorithm utilizing a behavioral CTLE+1 tap DFE equivalent or better, and a behavioral CDR. Thus, the PCI Express 3.0 specification assumes a model receiver that equalizes as well as the combination of a continuous time linear equalizer (CTLE) and a 1 tap decision feedback equalized (DFE). The CTLE compensates for the greater attenuation of higher frequency components of a signal relative to the lower frequency components, while the DFE adapts to any drift in signal offset due to inter symbol interference.

There are preferably four high level steps in the dynamic equalization process. First, at Phase 0, an upstream component (downstream port) sends to a downstream component (upstream port) of both Transmitter and Receiver presets at 2.5G to be used upon entering 8.0G. This process is used for speed change negotiation. Next, in Phase 1, an 8 GT/s link is established at E-4 BER or better. At this time, both sides also advertise EQ capabilities via FS/LF fields. Then, during Phase 2, the downstream component adjusts the upstream TX while adjusting its own RX until achieving optimal settings. Finally, in phase 3, the upstream component adjusts the downstream TX while adjusting its own RX until achieving optimal settings.

As noted above, both Preset and Cursor values can be used to adjust TX equalization settings. There are preferably 10 Presets (pre-defined combinations of de-emphasis and pre-shoot) legal (According to the PCI Express 3.0 protocol) for a request during Phases 0, 2, and 3 noted above. Additionally, there are a minimum of 42 combinations of de-emphasis and pre-shoot available when requesting via Cursor values.

It is of course critical that devices purporting to meet the PCI Express 3.0 protocol actually do so. Thus, compliance testing of the various devices is critical. The reason for compliance testing is to ensure interoperability. Failure to successfully negotiate equalization could cause the link to switch to a lower speed. Examples of non-compliance may include:
  (1) No Response—Trainee component fails to respond to a Link EQ request, Trainer component unable to converge on a solution
  (2) Late Response—Trainee component responds too late to Preset/Cursor request. Trainer component trains its receiver on false information or does not have enough time to train (3) Incorrect Response—Trainee component sets the wrong Preset/Cursor on its transmitter. Trainer component trains its receiver on false information.

Therefore, it would be beneficial to provide a system and apparatus that allows for proper testing of such link equalization as set forth in the PCI Express 3.0 protocol to confirm compliance of various devices to the protocol standard.

Still other objects and advantages of the invention will be apparent from the specification and the drawings.

BRIEF DESCRIPTION OF DRAWINGS

For a more complete understanding of the invention, a reference is made to the following description and accompanying drawings, in which.

DETAILED DESCRIPTION

A detailed description of illustrative embodiments will now be provided, making reference to the figures and providing details of the information flow. Like reference numbers and designations in the various figures indicate like elements.

Figure 1:
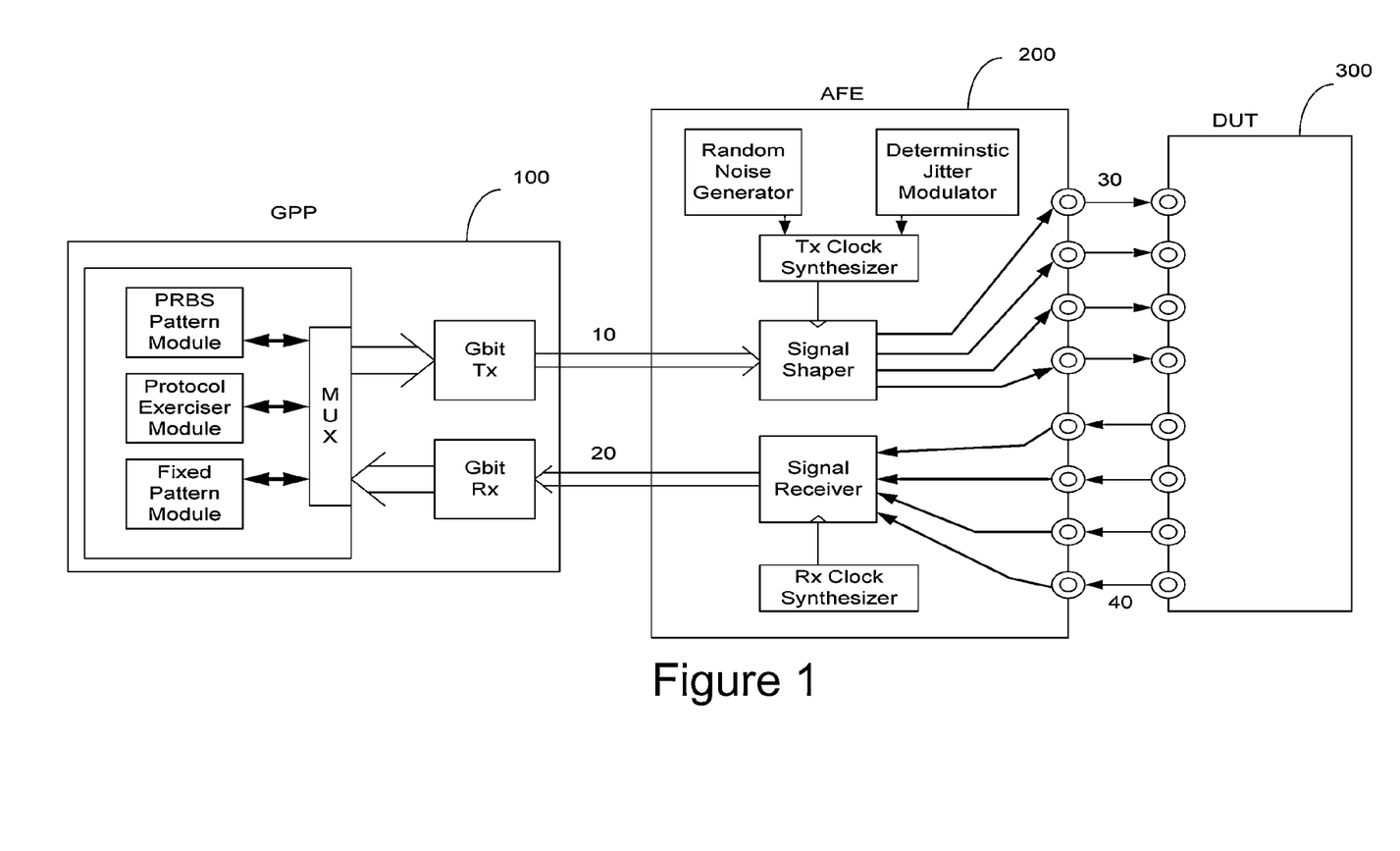
FIG. 1 depicts a system block diagram which includes a General Purpose Processing (GPP) unit, an Analog Front End (AFE), and their connections to a Device or System Under Test (DUT) in accordance with the invention.

FIG. 1 depicts a preferred embodiment of the invention. The invention will be described with respect to a method used to test and measure errors on a serial communication link. A GPP unit 100 is responsible for higher level protocol awareness, as is known in the art according to protocol exercisers that are currently available. Such a GPP unit is capable of connecting to a system or device under test and communicating with the device on all protocol levels of interest. However, it is known that the GPP generates signals 10 that are not able to be appropriately controlled and are not clean and accurate enough to be used in an effort to evaluate physical layer link and device receiver characteristics. In order to achieve signals of such high fidelity and controllability, an AFE unit 200 is preferably attached to GPP 100. AFE unit 200 receives signals generated by GPP unit 100 and is responsible for generating a clean signal with a predetermined, programmed and calibrated amount of jitter and signal shaping as defined by the user in order to stress signals 30 that are being transmitted to the DUT (unit 300).

Figure 2:
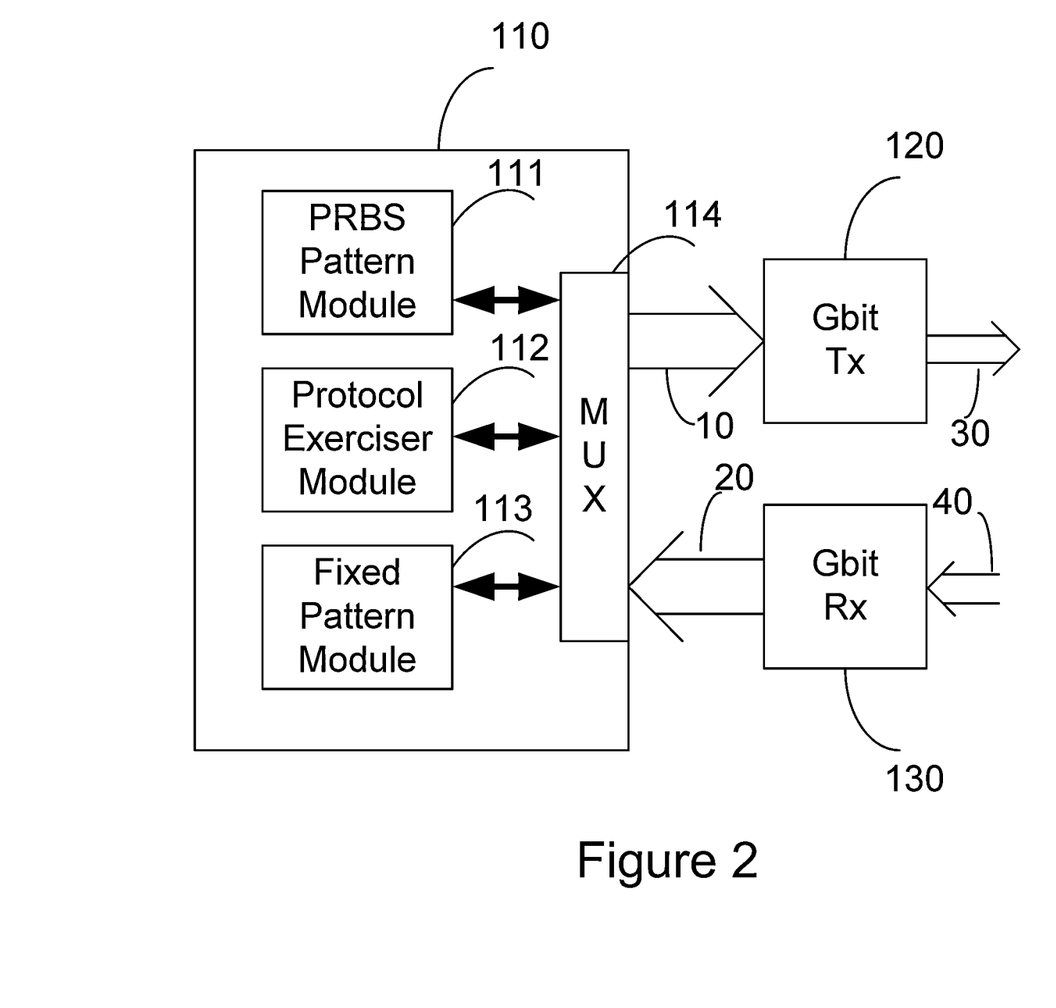
FIG. 2 depicts the internal major blocks of the GPP, including a logic block, a Gigabit transmitter and a Gigabit receiver in accordance with the invention.

FIG. 2 illustrates the internal building blocks of GPP unit 100. GPP unit 100 is preferably implemented in a Field Programmable Gate Array (FPGA) (although other appropriate implementation mechanisms may of course be employed) which has all the building blocks required to perform the various traffic generation and serial communication protocol reception tasks in accordance with the invention. The FPGA Fabric 110 is comprised of four sub blocks. The first two, a PRBS generator 111 and a Fixed pattern generator 113, along with accompanying error detectors, essentially have the functionality of a standard BERT system. FPGA Fabric 110 further preferably includes a Protocol Exerciser module 112 that comprises the protocol awareness brains in accordance with the invention, and is responsible for communicating with the DUT 300 and placing it into a desired correct test mode. Also included is a multiplexer 114 which directs parallel buses to/from the FPGA fabric from/to a front end Gigabit Transmitter 120 and Receiver 130.

Gigabit Transmitter 120 and Gigabit Receiver 130 are implemented in the FPGA MGT (Multi Gigabit Transceiver) blocks. Gigabit Transmitter 120 preferably receives parallel bus signals from FPGA Fabric 110 and converts these received signals into a serial bit stream. As noted above, however, the signal quality of this serial bit stream is not good enough to qualify and characterize receivers at the signal level. This is at least in part because the shape of the signals, and amount of jitter present in the signals are unknown and cannot be controlled. Therefore, this generated serial bit stream is transmitted to AFE 200 for readjustment of the signal physical characteristics. When testing a device and a return signal is received, Gigabit Receiver 130 receives the returned bit stream from AFE 200 and converts it to a parallel signal to be provided on a parallel bus to FPGA Fabric 110.

Figure 3:
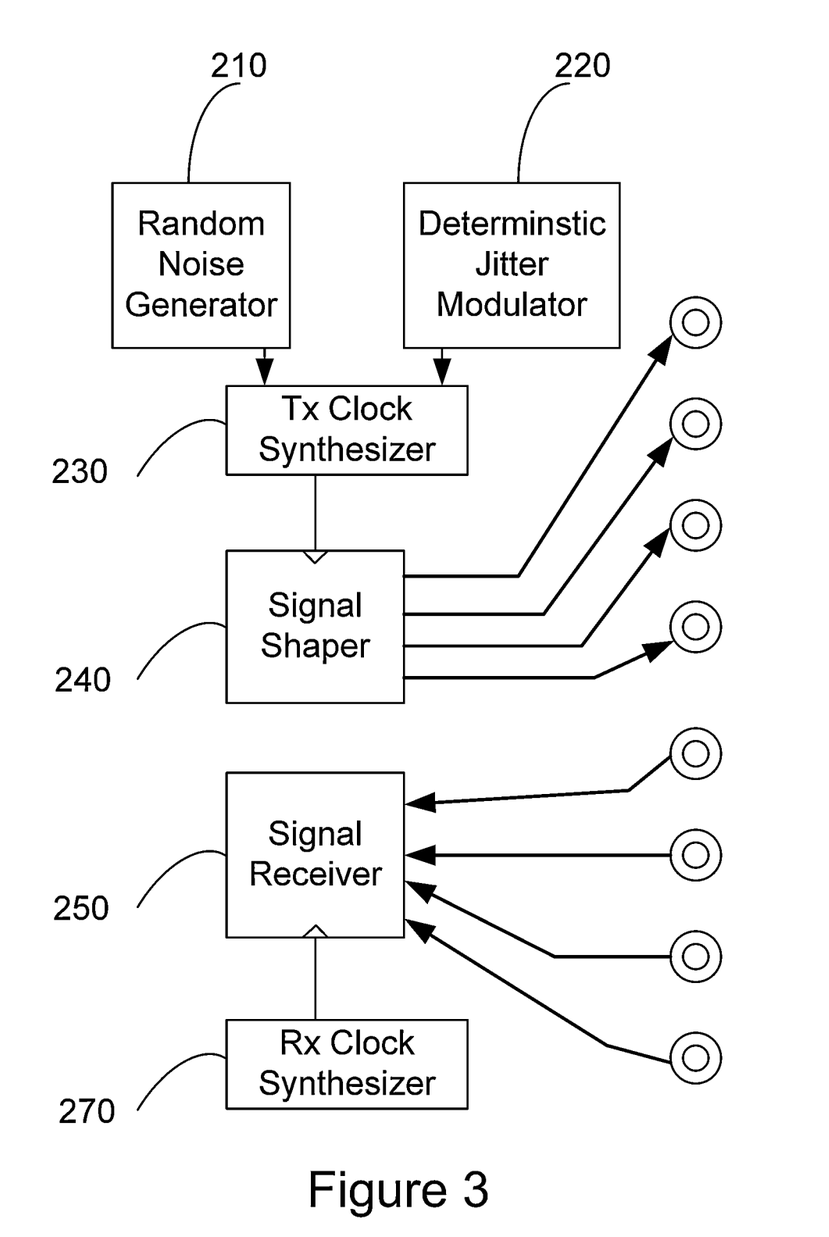
FIG. 3 illustrates the major blocks of the AFE of FIG. 1, including a Random Noise Generator, a Deterministic Jitter Generator, a Transmitter Clock Synthesizer, a Signal Shaper, a Signal Receiver and a Receiver Clock Synthesizer in accordance with the invention.

FIG. 3 illustrates the internal building blocks of AFE 200. A Signal Shaper 240 receives a stimulating serial stream 10 from a GPP 100. Shaper 240 is a synchronous block that is clocked by a Transmit Clock Synthesizer 230, which synthesizes a clean clock. This clean clock can be modulated with both Random and Deterministic jitter components, these jitter components being driven by a Random Noise Generator 210 and a Deterministic Jitter Modulator 220. The sum of these jitter components is seen directly on the output 30 of Signal Shaper 240 as the signal including the jitter components serves as the clock source for the synchronous element in signal shaper 240. Signal shaper 240 also includes signal shaping capabilities, such as voltage amplitude control, rise and fall time control, pre-emphasis control and ISI jitter and noise additions. When none of the jitter and noise components are active, signal 30 is provided as a clean signal with very minimal jitter (including only the intrinsic jitter of the tool), and thus an eye diagram opening would be at its maximum level. Signal Receiver unit 250 preferably includes an independent Clock Synthesizer source 270, and is capable of moving the vertical threshold of the receive signal and the sampling time point of the received signal. By providing such flexibility of moving both the sampled time and vertical voltage threshold, it is possible to perform statistical analysis on the signal transmitted from the DUT 300. This analysis serves for creating such graphs as eye diagram, bathtub curves and eye contour among others.

Figure 4:
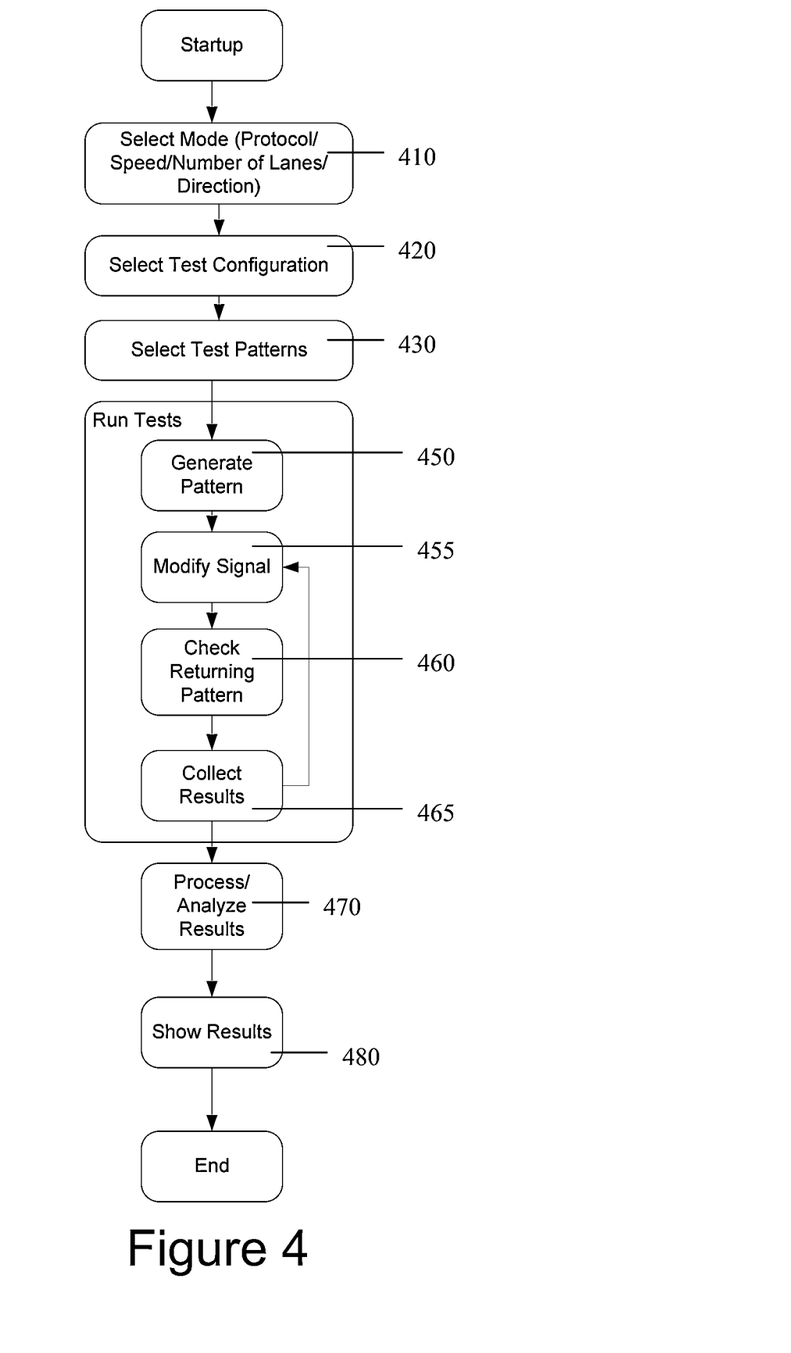
FIG. 4 is a flowchart diagram depicting information flow during operation in accordance with the invention.

Referring next to FIG. 4, a description of operation of a preferred embodiment of the invention will now be provided. As is shown in FIG. 4, after startup, setup of the apparatus in accordance with the invention is performed. Such setup includes first, selecting a test mode at step 410, which in turn further comprises at least defining a protocol to be tested, a speed of operation, a number of lanes to be tested, and a direction of information flow along those lanes. Thereafter, a test configuration is selected at step 420 and various test patterns are selected at step 430.

After setup, various tests are performed. These tests comprise the steps of first generating one or more test patterns at step 450 and then modifying a signal according to the test patterns and in accordance with the other test protocols at step 455. This modified signal is forwarded to a DUT, and a returning pattern is received therefrom by the testing apparatus. This return pattern is checked, preferably by comparison to an expected return pattern at step 460. The results of this comparison are collected at step 465, and if additional testing is to be performed, processing returns to step 455 and the signal is once again modified either in a similar or different manner according to the implemented test procedure. After all testing is performed, processing passes to step 470 where the collected results are further processed and analyzed, and thereafter results are displayed or otherwise provided to a user. Processing then ends.

In an embodiment of the invention, implementation of a link equalization procedure may be included with the above-described apparatus, or may be implemented in another test and measurement apparatus. Link equalization allows for devices to communicate with each other at a highest possible speed supportable by the pair of devices in accordance with a prescribed protocol, for example. This allows for a highest speed communication between two or more devices capable of such communication, but allows for slower communication with slower devices, all within the single protocol. Thus, communication speeds are no longer limited to the slowest speed achievable by the slowest device supported by the protocol. PCI Express 3.0 is an example of a protocol having such a link equalization procedure included therein. Two devices communicating according to such a protocol will be able to communicate at a highest supportable speed. In order for such a process to be available and to be provided for highest speed, consistent communications, each device purporting to adhere to the protocol specification and allow for such link equalization. Therefore, a specialized test and measurement apparatus is provided in accordance with an embodiment of the invention.

In accordance with the PCI Express 3.0 protocol, a particular first device in communication with a second device must respond within 500 ns to a request to set its transmitter to a particular speed (including other types of settings). Therefore, Link Equalization Testing performed in accordance with an embodiment of the present invention checks whether a device under test (DUT):
(1) responds within 500 ns to a request to set its transmitter to a specific equalization, and (2) requests a good transmitter setting from the opposing end so that the DUT's receiver can receive data at an E-12 BER or better.

An embodiment of the invention provides a test and measurement apparatus that implements a number of features that advances the state of physical layer testing. These features include:
(1) a text-based state-machine that defines the behavior of the test and measurement apparatus;
(2) real-time ability to change physical and protocol characteristics based upon entry to different states of the state-machine at run time;
(3) real-time ability to changes states based upon detected physical and protocol characteristics at run time;
(4) physical characteristic control via the state-machine at run time. The physical characteristics that may be changed may preferably include:
 (a) real-time ability to change within 500 ns electrical de-emphasis and pre-shoot;
 (b) real-time ability to detect physical events (example, electrical idle, signal detection, etc);
 (c) real-time ability to generate an output trigger upon entry to a state.
(5) protocol characteristic control via the state-machine, including:
 (a) real-time ability to choose scrambling and descrambling (examples, scrambling for PCIe Gen 2.0 2.5G/5G data versus PCIe Gen 3.0 8G data);
 (b) real-time ability to choose coding and decoding (examples, 8b/10b versus 128b/130b);
 (c) real-time ability to choose sampling rate (example, 1 of 1 versus 5 of 16);
 (d) real-time ability to detect protocol events (example, certain bits set in training sequences, electrical idle, etc);
 (e) real-time ability to transmit different patterns (example, user definable patterns, pre-defined patterns such as PRBS, etc.);
 (f) real-time ability to filter user-defined packets when comparing transmitted data with received data for bit error analysis.

In a preferred embodiment of the invention, such as that employed in a PeRT3 Phoenix Teledyne LeCroy Implementation, the following additional features and benefits may be achieved:
(1) dedicated controls from FPGA logic to analog circuits to quickly change the characteristics of its transmitted signal;
(2) proprietary scripting language that defines states, patterns, events, state transitions;
(3) software to compile the scripts into microcode that load into specialized logic;
(4) specialized logic engine in an FPGA which interprets microcode to implement the state-machine;
(5) infrastructure of physical layer (de-)scramblers, (de-)coders, and detectors to and from the engine;
(6) software control and monitoring of the state-machine during operation.

Figure 6:
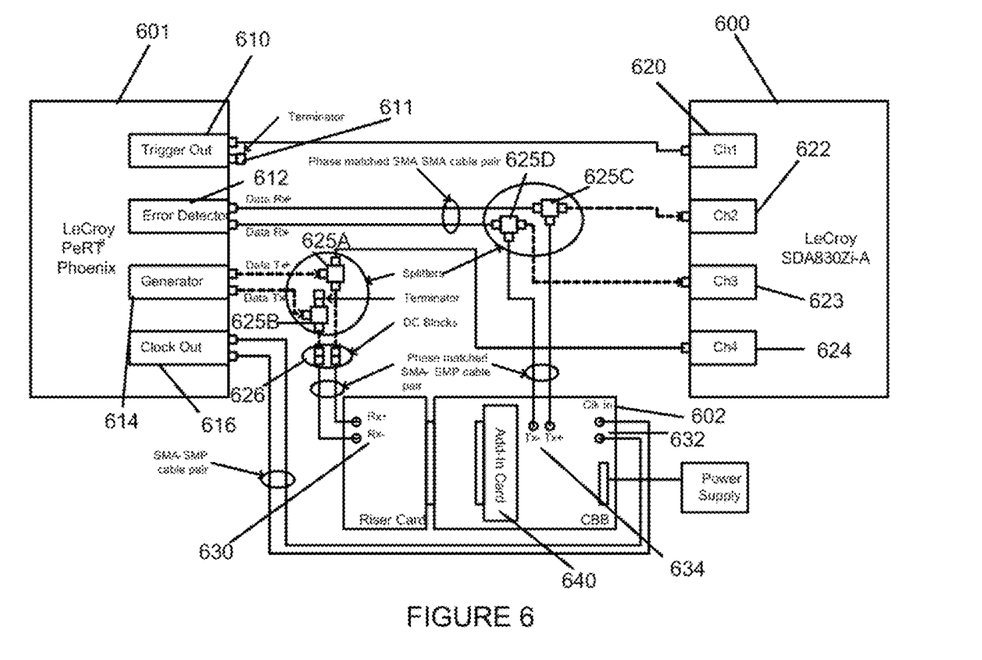
FIG. 6 depicts a system for testing link equalization of an Add In Card in accordance with an embodiment of the invention.

Referring next to FIG. 6, a preferred embodiment of the invention is shown. The preferred embodiment preferably employs an oscilloscope, such as a Teledyne LeCroy SDA830Zi-A 600, coupled to a Teledyne LeCroy PeRT$^3$ Phoenix device 601. As is shown, a trigger out 610 of the Phoenix device is preferably coupled to a first channel 620 of the oscilloscope (a terminator 611 also being employed at the trigger out 610 of the Phoenix device). The remaining ports of device 601 are employed to couple a test bench 602 and oscilloscope 600 with device 601. Test bench 602 preferably comprises a test bench platform for receiving one or more Add In Cards 640 to be tested in accordance with the various embodiments of the invention. Therefore, as is shown in FIG. 6, device 601 includes a data generator port 614, including transmission elements Data Tx+ and Data Tx− for generating various testing data. This testing data is preferably received by data receiving elements 630, including Rx+ and Rx−, of test bench 602. These data transmission lines are preferably comprised of phase matched SMA-SMP cable pairs. The data transmitted on the Data Tx+ line is preferably also forwarded to a port (in this example, channel 3) of oscilloscope 600 via a splitter 625A. A similar splitter 625B is preferably provided on the data line from Data Tx− to ensure similar line characteristics, although this splitter is preferably terminated, and therefore corresponding data is therefore preferably not forwarded to oscilloscope 601. DC blocks 626 may also be provided to further condition data on these lines.

A clock out 616 is also provided at device 601, therefore providing two clock out lines to be received by clock in port 632 of test bench 602. Thus, during use, transmission data and a clock signal are provided from device 601 to test bench 602 (and the transmission signal also being provided to oscilloscope 601, shown as being received at channel 4 623 thereof in this particular example). Test bench 602 receives the clock signal and transmission data and processes this data. In accordance with a particular embodiment of the invention, this information comprises test data, and is processed by test bench 602 including Add In Card 640, thereby testing the characteristics thereof. Processing, such as speed link testing, as described above, may be provided to determine whether Add In Card 640, for example, is compliant with equalization link testing as described in accordance with the various embodiments of the invention.

As the data is processed, test bench 602 preferably transmits resulting response data via DUT transmission ports 634, including transmission lines Tx+ and Tx−, these data lines similarly comprising phase matched SMA-SMP phase matched cable pairs. Via splitters 625C and 625D, the transmitted response data is forwarded to channels 2 (622) and 3 (623) of oscilloscope 600 in this exemplary embodiment, as well as being forwarded to an error detector port 612, receiving such data or port elements Rx+ and Rx−. Thus, various errors are determined by device 601 on the received data, and is thus able to determine whether Add In Card 640 within test bench 602 is able to sustain higher speeds during link equalization testing, or other testing as appropriate. Results of testing data are also preferably displayed on oscilloscope 600. Using such a test setup, the link equalization testing described above may be efficiently implemented employing the noted oscilloscope 600, device 601, and test bench 602, including Add In Card 640.

Figure 10:
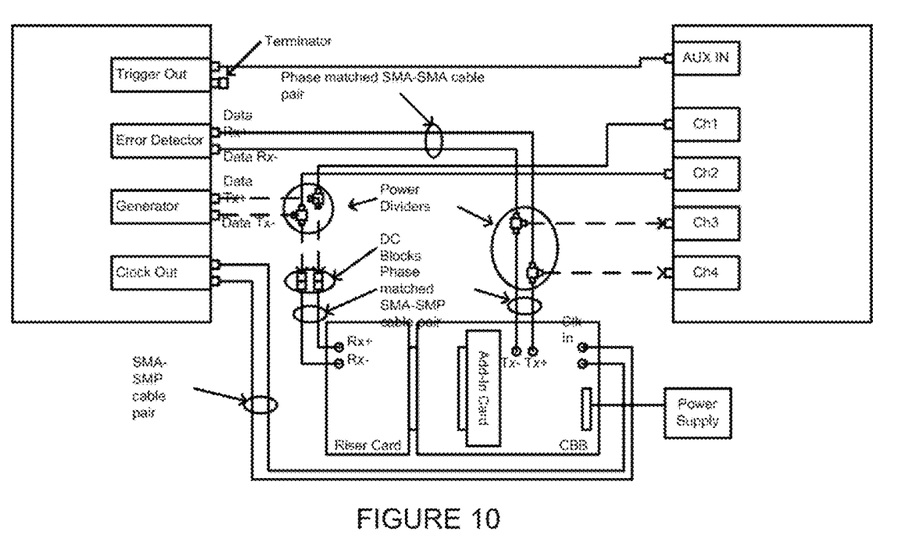
FIG. 10 is an alternative embodiment of the system for testing link equalization of an Add In Card of FIG. 6.

In an alternative embodiment of the system shown in FIG. 6, the PeRT Tx port may be routed differentially to the oscilloscope channel input and the trigger to the auxiliary input of the oscilloscope. This alternative connection scheme may allow the oscilloscope to handle differential signals better, as it received them differentially. A version of an example of this embodiment is shown in FIG. 10.

Figure 7:
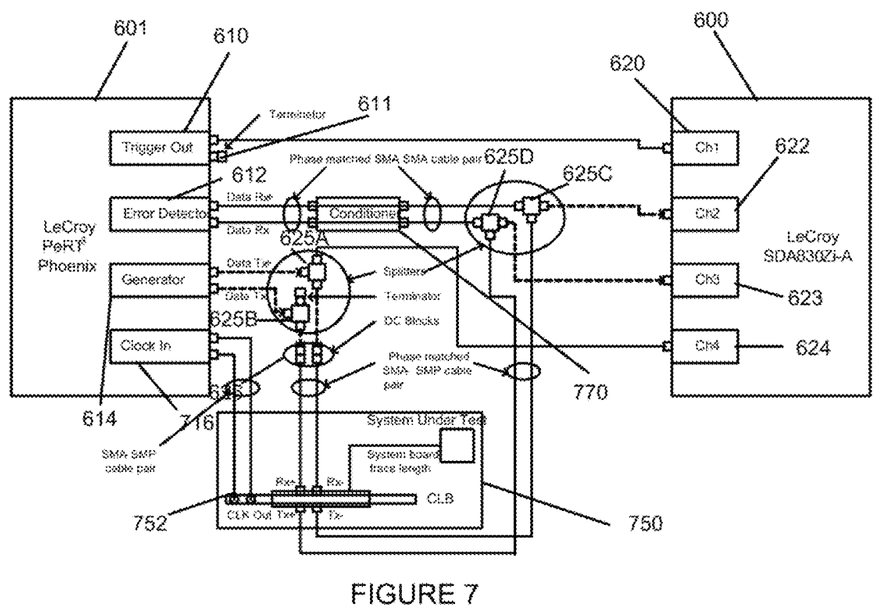
FIG. 7 depicts a system for testing link equalization of a system in accordance with an embodiment of the invention.

Referring next to FIG. 7, a similar test setup is depicted in which a system is being tested (DUT 750), rather than an Add In Card 640. As is shown in FIG. 7, a system under test (SUT) 750 (or device under test, DUT) is provided. Such a SUT is coupled to oscilloscope 600 and device 601 similarly to the manner described in FIG. 6. However, rather than device 601 providing a clock to the test bench 602, in this particular embodiment of the invention, SUT 750 provides a clock out 752 to be received by a click in port 716 of device 601. Data transmission and the like provided in accordance with the embodiment shown in FIG. 7 are similar to those in FIG. 6, with the exception that the system 750 is tested, rather than the Add In Board 640. Furthermore, in accordance with an alternative embodiment of the invention, a conditioner 770 may be provided on the error detection lines being forwarded to error detector 612 of device 601. Such a conditioner further smoothes the data for better error detection, and is preferably employed in that power dividers may 625C and 625D may divert a portion of signal energy being provided to error detector 612.

Figure 11:
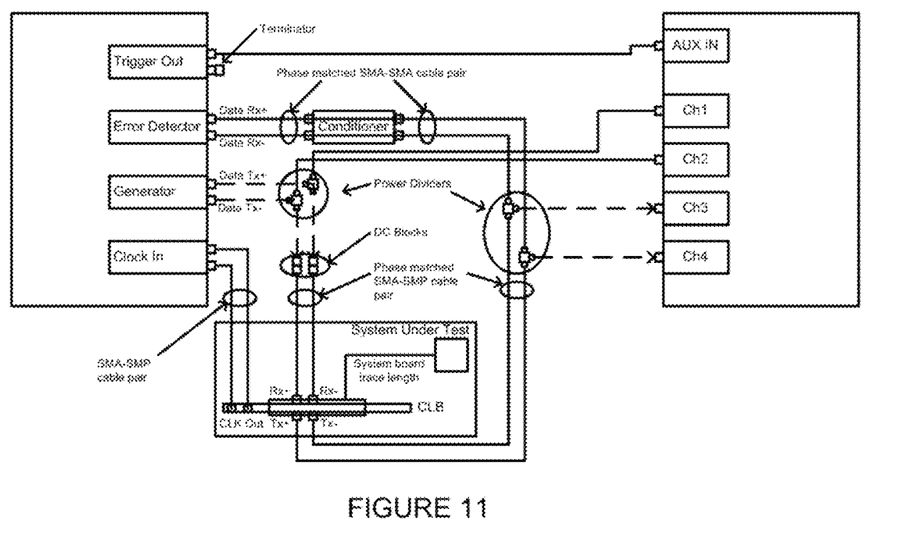
FIG. 11 is an alternative embodiment of the system for testing link equalization of a System of FIG. 7.

In an alternative embodiment of the system shown in FIG. 7, the PeRT Tx port may be routed differentially to the oscilloscope channel input and the trigger to the auxiliary input of the oscilloscope. This alternative connection scheme may allow the oscilloscope to handle differential signals better, as it received them differentially. A version of an example of this embodiment is shown in FIG. 11.

Figure 8:
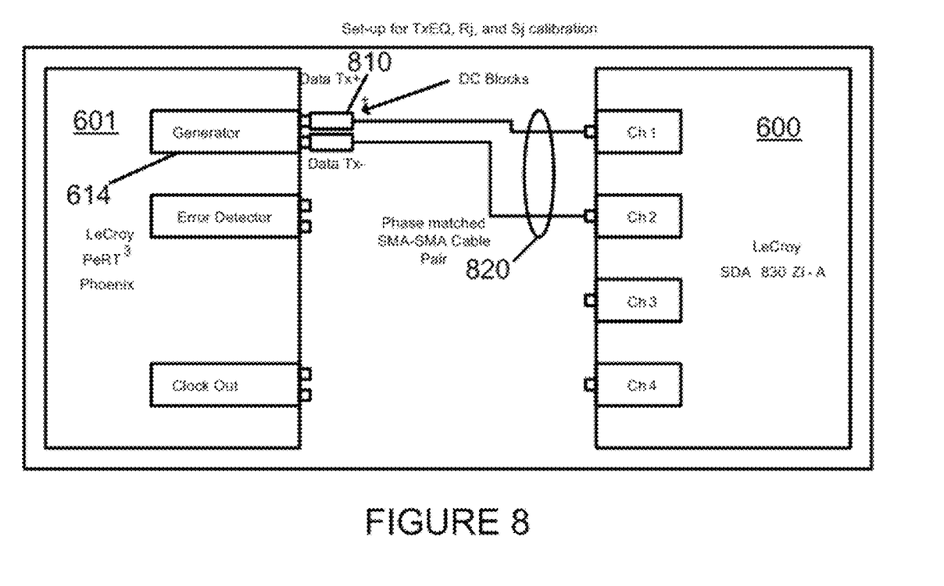
FIG. 8 depicts a system for jitter calibration in accordance with an embodiment of the invention.

Thus during use of either of the test setups depicted in FIG. 7 or 8 (or corresponding FIG. 10 or 11), device 601 provides and receives data from the device or system under test, putting the device or system under test through various steps that would be required when performing link equalization during actual operation of the system or device under test. Oscilloscope 600 receives and displays output of the testing process. In such a manner, employing the depicted testing setups and the test protocol described above, one or more devices or systems can be confirmed to comply with link equalization, or other protocol requirements, such as those described herein.

Figure 9:
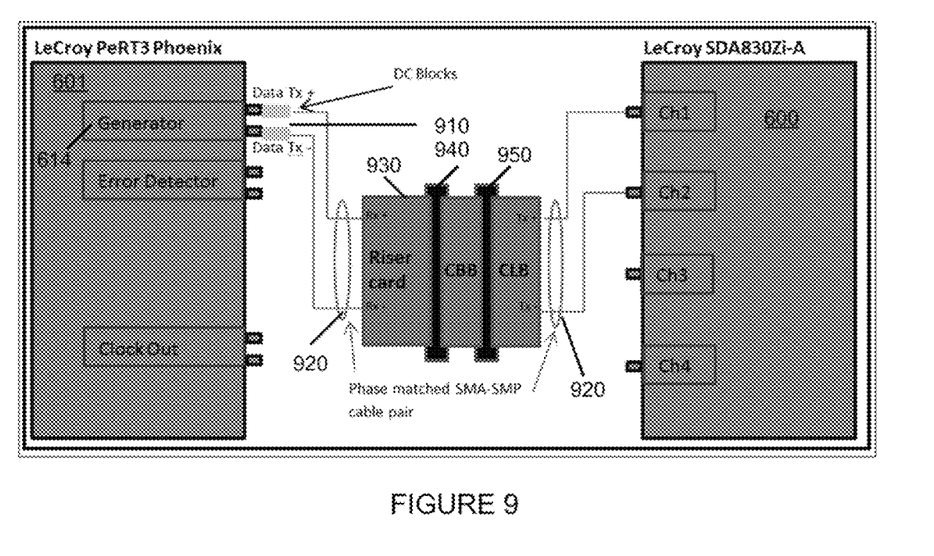
FIG. 9 depicts a system for further calibration in accordance with an embodiment of the invention.

During use, first the system is preferably calibrated, and is therefore set up for calibration as is shown in FIGS. 8 and 9. A similar calibration process is preferably employed for use with the test systems described above in FIGS. 6 and 7. Therefore, as is first shown in FIG. 8, a generator portion 614 of device 601 is coupled, via DC blocks 810 and phase matched SMA-SMA cable pair 820, to first and second channels of oscilloscope 600. At this step in the calibration process, preferably, Sj (Systematic Jitter) is first calibrated. During this process, a compliance pattern is transmitted from device 601 at approximately 800 mV, with no de-emphasis. The predefined Sj is preferably set to 100 MHz at 0 ps (picoseconds), 5 ps, 10 ps and 20 ps. A differential waveform is captured at oscilloscope 600 at 8 M Samples with a 13 GHz band limit. A measured value at 0 ps is then reported as a baseline for the Max Peak to Peak value. Thereafter, Rj (Random Jitter) is then preferably calibrated. During this process, a toggle pattern ("0, 1, 0, 1, 01 . . . ") is transmitted from device 601 at approximately 800 mV, with no de-emphasis. Then a very high frequency (VHF) Rj, preferably spanning 1.5 MHz to 1 GHz, is preferably set at Ops and 0.5 ps to 5.0 ps in 0.5 ps steps. A differential waveform is captured at oscilloscope 600 at 8 M Samples with a 13 GHz band limit. The reported values then comprise the RMS jitter of the system.

In order to properly calibrate the system employing such jitter measurements, the obtained sample values may be charted as a well known eye diagram. Adjustments to the various calibration settings may be made in order to adjust the shape of the eye diagram until a desired eye diagram in obtained. Such a shape may be defined in accordance with one or more protocol definitions, or the like. In particular, such eye diagram definitions for Add In Card testing may comprise an eye height of 46+0/−5 and an eye width of 41.25+0/−2. For testing a system, the desired measurements of the eye may be an eye height of 50+0/−5 and an eye width of 45+0/−2. Of course, other protocols may define different desirable eye diagram parameters.

Referring next to FIG. 9, a setup of the inventive system for calibration for when the system is to be used to test one or more Add In Cards or a system operating in accordance with a predetermined protocol is depicted. As is shown in FIG. 9, generator portion 614 of device 601 is provided with DC blocks 910 on outputs thereof. These DC blocks further preferably have phase matched SMA-SMP cable pair 920 coupled thereto. A riser card 930 is coupled to the cable pair 920, thus receiving a generated signal on ports Rx+ and Rx− thereof. Alternatively, the system to be tested (such as system 750 as depicted in FIG. 7). During this calibration step, calibration boards CBB 940 and CBL 950 are provided coupled to riser card 930. An output from riser card 930 on ports Tx+ and Tx− thereof are then forwarded to Channels 1 and 2 of oscilloscope 600 via a second cable pair 920.

Calibration employing the system as set forth in FIG. 9 preferably proceeds in the following manner in accordance with a particular exemplary embodiment of the invention. Of course, other settings and calibration schemes may also be employed. Oscilloscope 600 is preferably set to sample at 40 GS/s at 20 GHz, although other settings may be employed. Furthermore, the bandwidth is preferably limited for the calibration, and in this particular embodiment, the limit may be set to 8 GHz. Device 601 may also preferably be set to transmit an Electrical Idle pattern on its transmission ports (Tx+, Tx−). The signal amplitudes is preferably turned off, and the differential mode noise (DM) is set to 2100 MHz. Next, in order to calibrate the system when Add In Cards are to be tested, output signals may be provided ranging from 0 mV to 50 mV in 10 mV steps, while when calibrating for testing a complete system preferably output signals may be provided ranging from 0 mV to 100 mV in 10 mV steps. Measurements are then made employing oscilloscope 600, at each output voltage, and preferably a calibration graph is generated.

After calibration the system may be used to test proper functioning of an Add In Card or system in accordance with the link equalization procedure defined by the PCI Express Gen 3 protocol, by way of example. A preferred general procedure for performing this testing comprises the general processes of first collecting data, and then analyzing the collected data. When performing these processes, first an initial transmitter equalization test at 8.0 Gt/s is performed. In accordance with this initial transmitter equalization test, a plurality of presets, comprising one or more desired, specific transmitter equalization values are first defined (as preferably set forth in accordance with one or more specification definitions. Processing is then performed of each of these presets, and in particular, once a preset equalization pattern is loaded, device 601 requests a change of the speed of the device under test to 8G speed. The test setup then is placed into a loopback mode, and a compliance pattern is transmitted from device 601 to the device under test. A responsive waveform provided by the device under test in response to the presented stimulus is then captured by oscilloscope 600. This process is then preferably repeated for each of the predefined presets. Once the process has been completed for each of the presets, the acquired waveforms are fed into a SigTest software package (or other desired software package) and valid presets are verified.

After such transmitter equalization has been performed, a first phase of a receiver link equalization test for 8.0 GT/s may be performed, testing either an Add In Card or system. The testing process is similar to that noted above with respect to the equalization testing, but includes the further steps of, after changing the speed of the system to 8G, defining a next preset to be tested, monitoring transactions, including request and response, and determining whether such responses are provided in less than or equal to 500 nanoseconds are required by the PCI Express Gen 3 protocol.

A second phase of such a receiver test may then preferably be performed. In accordance with this second test phase, three general steps of generating a calibrated eye diagram (according to the procedure noted above), performance of a complete equalization procedure and entering loopback mode, and then measuring the Bit Error Rate are performed. In more particular detail in accordance with a preferred embodiment of the invention, a receive test is performed in which a modified compliance pattern that is preferably defined in accordance with the PCI Express 3.0 Specification (or other specification that may be employed) for receiver testing, may be sent from device 601. The device under test may be considered to have passed the test if there are zero or one errors in 2:05. If 0 errors are found in 6:15, it is determined to a 95% confidence level that the Bit Error Rate is 1 in $10^{12}$.

Therefore, in accordance with the various embodiments of the present invention, one or more processes and devices are provided to perform at least link equalization testing. Such link equalization parameters may be defined by a predetermined protocol, such as the PCI Express Gen 3 protocol. Such testing allows support of dynamic equalization, which is necessary if devices want to support a variety of channel speeds. This link equalization testing is still further crucial to ensure interoperability of various devices and cards within the defined protocol, thus allowing for the fastest communication protocols to be achieved. While significant hardware and software are required to perform such testing, such a practical test environment is achievable in accordance with the various embodiments of the present invention.

Therefore, in accordance with the invention, a user is able to test the physical layer of a high speed serial communication device while maintaining an awareness of the protocol being implemented by the device, and is further able to confirm adherence to one or more protocol defined requirements, including link equalization speed optimization. The following benefits may be achieved in accordance with the various embodiments of the invention. First, the inventive test apparatus is able to respond to a DUT's request to change the test device's transmission equalization (TxEQ) within 500 ns. As is noted above, this is accomplished with fast hardware control lines from the GPP to the AFE. Next, the inventive test apparatus is able to negotiate a PCI Express link equalization protocol using a protocol-aware BERT: This is accomplished by putting together a proprietary microcontroller implemented in an FPGA, physical layer encoding/decoding/scrambling/descrambling modules in an FPGA, proprietary text-based state-machine, a proprietary software compiler, and proprietary software interface and controller in the manner as described above. Additionally, the inventive test apparatus is able to generate all PCI Express required noise sources from a single enclosure and single software interface: This is accomplished with the specialized hardware described in this application. Finally, the inventive test apparatus is able to generate a trigger based upon the entry to a particular state in the PCIe LTSSM: This is accomplished using a proprietary microcontroller implemented in an FPGA as described above.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed:
1. A physical layer test and measurement system with protocol awareness, comprising:
an analog front end (AFE) unit with physical layer testing capabilities, the AFE unit adapted to generate and provide a signal to a device under test, the device under test acting as a signal receiver, the AFE unit further adapted to receive a signal from the device under test, the device under test acting as a signal transmitter; and a general purpose platform (GPP) with protocol awareness capabilities of one or more predefined protocols, the GPP further being adapted to perform testing on an input signal received from the AFE to determine errors on a protocol packet level at a plurality of different speeds of operation of the device under test in accordance with one or more of the one or more predefined protocols in accordance with the steps of:

(a) selecting a first of a plurality of preset values;
(b) sending an equalization signal from the AFE to the device under test;
(c) requesting a change in transmitter equalization to the device under test to a predetermined setting;
(d) confirming a change in transmitter equalization by the device under test to the predetermined setting within a predetermined time;
(e) entering the system into a loopback mode;
(f) sending a compliance pattern to the device under test from the AFE;
(g) capturing a waveform output from the device under test;
(h) repeating steps b-g for each of the plurality of preset values.

2. The system of claim 1, wherein the determination of errors on a protocol packet layer at a plurality of different speeds comprise performing a link equalization testing sequence.

3. The system of claim 1, further comprising a counter for counting a number of protocol packets including an error corresponding to one or more of the one or more predefined protocols.

4. The system of claim 3, further comprising a calculator for calculating a bit error rate in accordance with the counted number of protocol packets including an error.

5. A method for performing link equalization testing, comprising the steps of:

(a) providing a protocol aware test apparatus;
(b) selecting a first of a plurality of preset values;
(c) sending an equalization signal from the protocol aware test apparatus to a device under test;
(d) requesting a change in transmitter equalization setting to the device under test to a predetermined setting by the protocol aware test apparatus;
(e) confirming a change in transmitter equalization setting by the device under test to the predetermined setting within a predetermined time;
(f) entering the device under test into a loopback mode;
(g) sending a compliance pattern to the device under test from the protocol aware test apparatus;
(h) capturing a waveform output from the device under test;
(i) repeating steps b-h for each of the plurality of preset values; and
(j) analyzing the captured waveforms output from the device under test in response to each of the plurality of preset values.

6. The method of claim 5, wherein the protocol aware test apparatus is aware of a PCI Express Gen 3 protocol.

7. The method of claim 6, wherein a speed of communication is first requested to be changed to 8G.

8. The method of claim 5, further comprising the step of determining a fastest speed available for a particular device under test resulting in a desired eye pattern.

9. The method of claim 8, wherein the fastest speed available is therefore a speed at which the device under test is rated in accordance with a PCI Express Gen 3 protocol.

10. The method of claim 8, further comprising the step of, after sending an equalization signal from the protocol aware test apparatus to the device under test, responding electrically and protocol-wise within 500 ns to the transmission equalization setting request received from the device under test.

11. A physical layer test and measurement system, comprising:

a protocol aware test apparatus for transmitting testing data;
a device under test for receiving the transmitted testing data; and
an oscilloscope for receiving an output waveform from the device under test;
wherein the protocol aware test apparatus selects a first of a plurality of preset values, sends an equalization signal from the protocol aware test apparatus to the device under test, requests a change in transmitter equalization to the device under test to a predetermined setting, confirms whether the device under test changes to the predetermined setting within a predetermined time, and sends a compliance pattern to the device under test after placing the device under test in a loopback mode; and
wherein a waveform output from the device under test is captured by the oscilloscope.

12. The physical layer test and measurement system of claim 11, wherein the process of the protocol aware test apparatus and oscilloscope are repeated for each of the plurality of preset values.

13. The physical layer test and measurement system of claim 12, wherein the captured waveforms output from the device under test in response to each of the plurality of preset values are analyzed to determine a response profile of the device under test.

14. The physical layer test and measurement system of claim 11, wherein the protocol aware test apparatus is aware of a PCI Express Gen 3 protocol.

15. The physical layer test and measurement system of claim 14, wherein changes in the speed of communication is performed in order to perform a link equalization testing sequence in order to provide a desired eye pattern.

16. The physical layer test and measurement system of claim 11, wherein the protocol aware test apparatus is calibrated for jitter.

17. The physical layer test and measurement system of claim 11, wherein the device under test is a system.

18. The physical layer test and measurement system of claim 11, wherein the device under test is an Add In Card.

19. The physical layer test and measurement system of claim 18, further comprising a riser card for receiving the Add In Card.

20. The physical layer test and measurement system of claim 11, wherein the protocol aware test apparatus, after sending an equalization signal to the device under test, responds electrically and protocol-wise within 500 ns to the transmission equalization setting request received from the device under test.

* * * * *